United States Patent

Manhart

[11] Patent Number: 6,088,102
[45] Date of Patent: Jul. 11, 2000

[54] DISPLAY APPARATUS INCLUDING GRATING LIGHT-VALVE ARRAY AND INTERFEROMETRIC OPTICAL SYSTEM

[75] Inventor: Paul K. Manhart, Tucson, Ariz.

[73] Assignee: Silicon Light Machines, Sunnyvale, Calif.

[21] Appl. No.: 08/961,826

[22] Filed: Oct. 31, 1997

[51] Int. Cl.⁷ .................................................. G01B 9/02
[52] U.S. Cl. .......................................... 356/354; 356/345
[58] Field of Search .................................. 356/354, 345; 359/577, 578

[56] References Cited

U.S. PATENT DOCUMENTS

| Re. 16,767 | 10/1927 | Jenkins . | |
|---|---|---|---|
| Re. 25,169 | 5/1962 | Glenn . | |
| 1,525,550 | 2/1925 | Jenkins . | |
| 1,548,262 | 8/1925 | Freedman . | |
| 1,814,701 | 7/1931 | Ives . | |
| 2,415,226 | 2/1947 | Sziklai | 178/5.4 |
| 2,783,406 | 2/1957 | Vanderhooft | 313/70 |
| 2,991,690 | 7/1961 | Grey et al. | 88/16.6 |
| 3,553,364 | 1/1971 | Lee | 178/7.3 |
| 3,576,394 | 4/1971 | Lee | 178/7.3 |
| 3,600,798 | 8/1971 | Lee | 29/592 |
| 3,656,837 | 4/1972 | Sandbank | 350/161 |
| 3,743,507 | 7/1973 | Ih et al. | 96/81 |
| 3,802,769 | 4/1974 | Rotz et al. | 352/43 |
| 3,886,310 | 5/1975 | Guldberg et al. | 178/7.5 D |
| 3,896,338 | 7/1975 | Nathanson et al. | 315/373 |
| 3,935,499 | 1/1976 | Oess | 313/413 |
| 3,935,500 | 1/1976 | Oess et al. | 313/495 |
| 3,947,105 | 3/1976 | Smith | 353/121 |
| 3,969,611 | 7/1976 | Fonteneau | 219/502 |
| 4,001,663 | 1/1977 | Bray | 321/2 |
| 4,009,939 | 3/1977 | Okano | 350/162 SF |
| 4,012,116 | 3/1977 | Yevick | 350/132 |
| 4,017,158 | 4/1977 | Booth | 350/162 SF |
| 4,020,381 | 4/1977 | Oess et al. | 313/302 |
| 4,034,211 | 7/1977 | Horst et al. | 235/61.12 N |
| 4,067,129 | 1/1978 | Abramson et al. | 40/563 |
| 4,084,437 | 4/1978 | Finnegan | 73/361 |
| 4,093,346 | 6/1978 | Nishino et al. | 350/162 SF |
| 4,093,921 | 6/1978 | Buss | 325/459 |
| 4,093,922 | 6/1978 | Buss | 325/459 |
| 4,127,322 | 11/1978 | Jacobson et al. | 353/31 |
| 4,135,502 | 1/1979 | Peck | 128/76.5 |

(List continued on next page.)

FOREIGN PATENT DOCUMENTS

| 0 261 901 A2 | 3/1988 | European Pat. Off. | G09G 3/36 |
|---|---|---|---|
| 0 627 644 A3 | 9/1990 | European Pat. Off. | G02B 27/00 |
| 0 417 039 A1 | 3/1991 | European Pat. Off. | G03B 21/20 |

(List continued on next page.)

OTHER PUBLICATIONS

Russick et al., "Supercritical Carbon Dioxide Extraction of Solvent from Micromachined Structures," Supercritical Fluids, Chapter 18, pp. 255–269, 1997.

Buhler et al., "Linear Array of Complementary Metal Oxide Semiconductor Double–Pass Metal Micromirrors," Optical Engineering, vol. 36, No. 5, pp. 1391–1398, May 1997.

Gani et al., "Variable Gratings for Optical Switching: Rigorous Electromagnetic Simulation and Design," Optical Engineering, vol. 38, No. 3, pp. 552–557, Mar. 1999.

(List continued on next page.)

*Primary Examiner*—Robert H. Kim
*Assistant Examiner*—Andrew H. Lee
*Attorney, Agent, or Firm*—Haverstock & Owens LLP; R. Russel Austin

[57] ABSTRACT

Display systems employ a planar grating light-valve (GLV) array as a spatial light-modulator for representing an image to be displayed. The systems rely for image representation on the position of moveable reflective elements of the GLV array, which move through planes parallel to the plane of the array. The moveable elements provide, from an incident phase-constant wavefront, a reflected phase-modulated wavefront representing the image to be displayed. The displayed image is provided by interferometrically combining the phase-modulated wavefront with a reference wavefront also formed, directly or indirectly, from the incident phase-constant wavefront.

33 Claims, 7 Drawing Sheets

U.S. PATENT DOCUMENTS

| | | | |
|---|---|---|---|
| 4,139,257 | 2/1979 | Matsumoto | 350/6.1 |
| 4,163,570 | 8/1979 | Greenaway | 283/8 A |
| 4,184,700 | 1/1980 | Greenaway | 283/6 |
| 4,185,891 | 1/1980 | Kaestner | 350/167 |
| 4,211,918 | 7/1980 | Nyfeler et al. | 235/454 |
| 4,223,050 | 9/1980 | Nyfeler et al. | 427/163 |
| 4,225,913 | 9/1980 | Bray | 363/97 |
| 4,250,217 | 2/1981 | Greenaway | 428/161 |
| 4,250,393 | 2/1981 | Greenaway | 250/566 |
| 4,256,787 | 3/1981 | Shaver et al. | 428/1 |
| 4,327,411 | 4/1982 | Turner | 364/900 |
| 4,327,966 | 5/1982 | Bloom | 350/162 R |
| 4,338,660 | 7/1982 | Kelley et al. | 364/200 |
| 4,361,384 | 11/1982 | Bosserman | 350/174 |
| 4,389,096 | 6/1983 | Hori et al. | 350/339 R |
| 4,408,884 | 10/1983 | Kleinknecht et al. | 356/355 |
| 4,418,397 | 11/1983 | Brantingham et al. | 364/900 |
| 4,420,717 | 12/1983 | Wallace et al. | 318/696 |
| 4,430,584 | 2/1984 | Someshwar et al. | 307/465 |
| 4,440,839 | 4/1984 | Mottier | 430/2 |
| 4,443,819 | 4/1984 | Funada et al. | 358/236 |
| 4,443,845 | 4/1984 | Hamilton et al. | 364/200 |
| 4,447,881 | 5/1984 | Brantingham et al. | 364/488 |
| 4,454,591 | 6/1984 | Lou | 364/900 |
| 4,468,725 | 8/1984 | Venturini | 363/160 |
| 4,484,188 | 11/1984 | Ott | 340/728 |
| 4,492,435 | 1/1985 | Banton et al. | 350/360 |
| 4,503,494 | 3/1985 | Hamilton et al. | 364/200 |
| 4,556,378 | 12/1985 | Nyfeler et al. | 425/143 |
| 4,561,044 | 12/1985 | Ogura et al. | 362/84 |
| 4,566,935 | 1/1986 | Hornbeck | 156/626 |
| 4,571,041 | 2/1986 | Gaudyn | 353/10 |
| 4,571,603 | 2/1986 | Hornbeck et al. | 346/160 |
| 4,590,548 | 5/1986 | Maytum | 363/161 |
| 4,594,501 | 6/1986 | Culley et al. | 219/492 |
| 4,596,992 | 6/1986 | Hornbeck | 346/76 PH |
| 4,615,595 | 10/1986 | Hornbeck | 353/122 |
| 4,623,219 | 11/1986 | Trias | 350/351 |
| 4,636,866 | 1/1987 | Hattori | 358/236 |
| 4,641,193 | 2/1987 | Glenn | 358/233 |
| 4,645,881 | 2/1987 | LeToumelin et al. | 379/252 |
| 4,646,158 | 2/1987 | Ohno et al. | 358/236 |
| 4,652,932 | 3/1987 | Miyajima et al. | 358/236 |
| 4,655,539 | 4/1987 | Caulfield et al. | 350/3.6 |
| 4,662,764 | 5/1987 | Hornbeck | 350/269 |
| 4,663,670 | 5/1987 | Ito et al. | 358/245 |
| 4,698,602 | 10/1987 | Armitage | 332/7.51 |
| 4,709,995 | 12/1987 | Kuribayashi et al. | 350/350 S |
| 4,710,732 | 12/1987 | Hornbeck | 332/7.51 |
| 4,714,326 | 12/1987 | Usui et al. | 350/485 |
| 4,719,507 | 1/1988 | Bos | 358/92 |
| 4,722,593 | 2/1988 | Shimazaki | 350/336 |
| 4,728,185 | 3/1988 | Thomas | 353/122 |
| 4,744,633 | 5/1988 | Sheiman | 350/132 |
| 4,747,671 | 5/1988 | Takahashi et al. | 350/336 |
| 4,751,509 | 6/1988 | Kubota et al. | 340/784 |
| 4,761,253 | 8/1988 | Antes | 264/1.3 |
| 4,772,094 | 9/1988 | Sheiman | 350/133 |
| 4,803,560 | 2/1989 | Matsunaga et al. | 358/236 |
| 4,807,965 | 2/1989 | Garakani | 350/131 |
| 4,809,078 | 2/1989 | Yabe et al. | 358/236 |
| 4,811,210 | 3/1989 | McAulay | 364/200 |
| 4,814,759 | 3/1989 | Gombrich et al. | 340/771 |
| 4,827,391 | 5/1989 | Sills | 363/41 |
| 4,829,365 | 5/1989 | Eichenlaub | 358/3 |
| 4,856,863 | 8/1989 | Sampsell et al. | 350/96.16 |
| 4,856,869 | 8/1989 | Sakata et al. | 350/162.18 |
| 4,859,012 | 8/1989 | Cohn | 350/96.24 |
| 4,866,488 | 9/1989 | Frensley | 357/4 |
| 4,915,463 | 4/1990 | Barbee, Jr. | 350/1.1 |
| 4,915,479 | 4/1990 | Clarke | 350/345 |
| 4,934,773 | 6/1990 | Becker | 350/6.6 |
| 4,952,925 | 8/1990 | Haastert | 340/784 |
| 4,954,789 | 9/1990 | Sampsell | 330/4.3 |
| 4,956,619 | 9/1990 | Hornbeck | 330/4.3 |
| 4,978,202 | 12/1990 | Yang | 350/331 R |
| 4,982,184 | 1/1991 | Kirkwood | 340/783 |
| 4,984,824 | 1/1991 | Antes et al. | 283/91 |
| 5,003,300 | 3/1991 | Wells | 340/705 |
| 5,013,141 | 5/1991 | Sakata | 350/348 |
| 5,018,256 | 5/1991 | Hornbeck | 29/25.01 |
| 5,022,750 | 6/1991 | Flasck | 353/31 |
| 5,024,494 | 6/1991 | Williams et al. | 350/3.6 |
| 5,028,939 | 7/1991 | Hornbeck et al. | 346/160 |
| 5,035,473 | 7/1991 | Kuwayama et al. | 350/3.7 |
| 5,037,173 | 8/1991 | Sampsell et al. | 385/17 |
| 5,041,851 | 8/1991 | Nelson | 346/160 |
| 5,048,077 | 9/1991 | Wells et al. | 379/96 |
| 5,058,992 | 10/1991 | Takahashi | 359/567 |
| 5,060,058 | 10/1991 | Goldenberg et al. | 358/60 |
| 5,061,049 | 10/1991 | Hornbeck | 359/224 |
| 5,072,239 | 12/1991 | Mitcham et al. | 346/108 |
| 5,072,418 | 12/1991 | Boutaud et al. | 364/715.06 |
| 5,079,544 | 1/1992 | DeMond et al. | 340/701 |
| 5,083,857 | 1/1992 | Hornbeck | 359/291 |
| 5,089,903 | 2/1992 | Kuwayama et al. | 359/15 |
| 5,096,279 | 3/1992 | Hornbeck et al. | 359/230 |
| 5,099,353 | 3/1992 | Hornbeck | 359/291 |
| 5,101,184 | 3/1992 | Antes | 235/454 |
| 5,101,236 | 3/1992 | Nelson et al. | 355/229 |
| 5,105,207 | 4/1992 | Nelson | 346/160 |
| 5,105,299 | 4/1992 | Anderson et al. | 359/223 |
| 5,105,369 | 4/1992 | Nelson | 364/525 |
| 5,113,272 | 5/1992 | Reamey | 359/53 |
| 5,113,285 | 5/1992 | Franklin et al. | 359/465 |
| 5,119,204 | 6/1992 | Hashimoto et al. | 358/254 |
| 5,121,343 | 6/1992 | Faris | 395/111 |
| 5,128,660 | 7/1992 | DeMond et al. | 340/707 |
| 5,129,716 | 7/1992 | Holakovszky et al. | 351/50 |
| 5,132,812 | 7/1992 | Takahashi et al. | 359/9 |
| 5,142,303 | 8/1992 | Nelson | 346/108 |
| 5,142,405 | 8/1992 | Hornbeck | 359/226 |
| 5,142,677 | 8/1992 | Ehlig et al. | 395/650 |
| 5,148,157 | 9/1992 | Florence | 340/783 |
| 5,148,506 | 9/1992 | McDonald | 385/16 |
| 5,151,718 | 9/1992 | Nelson | 346/160 |
| 5,151,724 | 9/1992 | Kikinis | 357/17 |
| 5,155,604 | 10/1992 | Miekka et al. | 359/2 |
| 5,155,615 | 10/1992 | Tagawa | 359/213 |
| 5,155,778 | 10/1992 | Magel | 385/18 |
| 5,155,812 | 10/1992 | Ehlig et al. | 395/275 |
| 5,159,485 | 10/1992 | Nelson | 359/291 |
| 5,161,042 | 11/1992 | Hamada | 359/41 |
| 5,162,787 | 11/1992 | Thompson et al. | 340/794 |
| 5,165,013 | 11/1992 | Faris | 395/104 |
| 5,168,406 | 12/1992 | Nelson | 359/855 |
| 5,170,156 | 12/1992 | DeMond et al. | 340/794 |
| 5,170,269 | 12/1992 | Lin et al. | 359/9 |
| 5,170,283 | 12/1992 | O'Brien et al. | 359/291 |
| 5,172,161 | 12/1992 | Nelson | 355/200 |
| 5,172,262 | 12/1992 | Hornbeck | 359/223 |
| 5,178,728 | 1/1993 | Boysel et al. | 156/656 |
| 5,179,274 | 1/1993 | Sampsell | 250/208.2 |
| 5,179,367 | 1/1993 | Shimizu | 340/700 |
| 5,181,231 | 1/1993 | Parikh et al. | 377/26 |
| 5,182,665 | 1/1993 | O'Callaghan et al. | 359/95 |
| 5,192,946 | 3/1993 | Thompson et al. | 340/794 |
| 5,202,785 | 4/1993 | Nelson | 359/214 |
| 5,206,629 | 4/1993 | DeMond et al. | 340/719 |
| 5,212,555 | 5/1993 | Stoltz | 358/206 |
| 5,212,582 | 5/1993 | Nelson | 359/224 |
| 5,214,419 | 5/1993 | DeMond et al. | 340/794 |

| | | | | | | | |
|---|---|---|---|---|---|---|---|
| 5,214,420 | 5/1993 | Thompson et al. | 340/795 | 5,392,140 | 2/1995 | Ezra et al. | 359/41 |
| 5,216,537 | 6/1993 | Hornbeck | 359/291 | 5,392,151 | 2/1995 | Nelson | 359/223 |
| 5,221,982 | 6/1993 | Faris | 359/93 | 5,398,071 | 3/1995 | Gove et al. | 348/558 |
| 5,226,099 | 7/1993 | Mignardi et al. | 385/19 | 5,410,315 | 4/1995 | Huber | 342/42 |
| 5,231,363 | 7/1993 | Sano et al. | 332/109 | 5,411,769 | 5/1995 | Hornbeck | 427/534 |
| 5,231,388 | 7/1993 | Stoltz | 340/783 | 5,412,186 | 5/1995 | Gale | 219/679 |
| 5,231,432 | 7/1993 | Glenn | 353/31 | 5,418,584 | 5/1995 | Larson | 353/122 |
| 5,233,456 | 8/1993 | Nelson | 359/214 | 5,420,655 | 5/1995 | Shimizu | 353/33 |
| 5,237,340 | 8/1993 | Nelson | 346/108 | 5,430,524 | 7/1995 | Nelson | 355/200 |
| 5,237,435 | 8/1993 | Kurematsu et al. | 359/41 | 5,435,876 | 7/1995 | Alfaro et al. | 156/247 |
| 5,240,818 | 8/1993 | Mignardi et al. | 430/321 | 5,442,411 | 8/1995 | Urbanus et al. | 348/771 |
| 5,245,686 | 9/1993 | Faris et al. | 385/120 | 5,442,414 | 8/1995 | Janssen et al. | 353/98 |
| 5,247,180 | 9/1993 | Mitcham et al. | 250/492.1 | 5,444,566 | 8/1995 | Gale et al. | 359/291 |
| 5,247,593 | 9/1993 | Lin et al. | 385/17 | 5,445,559 | 8/1995 | Gale et al. | 451/388 |
| 5,254,980 | 10/1993 | Hendrix et al. | 345/84 | 5,446,479 | 8/1995 | Thompson et al. | 345/139 |
| 5,255,100 | 10/1993 | Urbanus | 358/231 | 5,447,600 | 9/1995 | Webb | 216/2 |
| 5,256,869 | 10/1993 | Lin et al. | 250/201.9 | 5,448,314 | 9/1995 | Heimbuch et al. | 348/743 |
| 5,262,000 | 11/1993 | Wellbourn et al. | 156/643 | 5,448,546 | 9/1995 | Pauli | 369/112 |
| 5,272,473 | 12/1993 | Thompson et al. | 345/7 | 5,450,088 | 9/1995 | Meier et al. | 342/51 |
| 5,278,652 | 1/1994 | Urbanus et al. | 358/160 | 5,450,219 | 9/1995 | Gold et al. | 359/40 |
| 5,278,925 | 1/1994 | Boysel et al. | 385/14 | 5,451,103 | 9/1995 | Hatanaka et al. | 353/31 |
| 5,280,277 | 1/1994 | Hornbeck | 345/108 | 5,452,024 | 9/1995 | Sampsell | 348/755 |
| 5,281,887 | 1/1994 | Engle | 310/335 | 5,452,138 | 9/1995 | Mignardi et al. | 359/855 |
| 5,281,957 | 1/1994 | Schoolman | 345/8 | 5,453,747 | 9/1995 | D'Hont et al. | 342/42 |
| 5,285,196 | 2/1994 | Gale, Jr. | 345/108 | 5,453,778 | 9/1995 | Venkateswar et al. | 347/239 |
| 5,285,407 | 2/1994 | Gale et al. | 365/189.11 | 5,453,803 | 9/1995 | Shapiro et al. | 353/119 |
| 5,287,096 | 2/1994 | Thompson et al. | 345/147 | 5,454,906 | 10/1995 | Baker et al. | 216/66 |
| 5,287,215 | 2/1994 | Warde et al. | 359/293 | 5,455,602 | 10/1995 | Tew | 347/239 |
| 5,289,172 | 2/1994 | Gale, Jr. et al. | 345/108 | 5,457,493 | 10/1995 | Leddy et al. | 348/164 |
| 5,291,317 | 3/1994 | Newswanger | 359/15 | 5,457,566 | 10/1995 | Sampsell et al. | 359/292 |
| 5,293,511 | 3/1994 | Poradish et al. | 257/434 | 5,458,716 | 10/1995 | Alfaro et al. | 156/245 |
| 5,296,950 | 3/1994 | Lin et al. | 359/9 | 5,459,492 | 10/1995 | Venkateswar | 347/253 |
| 5,297,473 | 3/1994 | Pauli | 369/112 | 5,459,528 | 10/1995 | Pettitt | 348/568 |
| 5,299,037 | 3/1994 | Sakata | 359/41 | 5,459,592 | 10/1995 | Shibatani et al. | 359/40 |
| 5,299,298 | 3/1994 | Omae et al. | 359/95 | 5,459,610 | 10/1995 | Bloom et al. | 359/572 |
| 5,301,062 | 4/1994 | Takahashi et al. | 359/567 | 5,461,410 | 10/1995 | Venkateswar et al. | 347/240 |
| 5,303,055 | 4/1994 | Hendrix et al. | 348/761 | 5,461,411 | 10/1995 | Florence et al. | 347/240 |
| 5,307,056 | 4/1994 | Urbanus | 340/189 | 5,461,547 | 10/1995 | Ciupke et al. | 362/31 |
| 5,307,185 | 4/1994 | Jones et al. | 359/41 | 5,463,347 | 10/1995 | Jones et al. | 330/253 |
| 5,311,349 | 5/1994 | Anderson et al. | 359/223 | 5,465,175 | 11/1995 | Woodgate et al. | 359/463 |
| 5,311,360 | 5/1994 | Bloom et al. | 359/572 | 5,467,106 | 11/1995 | Salomon | 345/87 |
| 5,312,513 | 5/1994 | Florence et al. | 156/643 | 5,467,138 | 11/1995 | Gove | 348/452 |
| 5,313,648 | 5/1994 | Ehlig et al. | 395/800 | 5,467,146 | 11/1995 | Huang et al. | 348/743 |
| 5,315,418 | 5/1994 | Sprague et al. | 359/41 | 5,469,302 | 11/1995 | Lim | 359/846 |
| 5,319,214 | 6/1994 | Gregory et al. | 250/504 R | 5,481,118 | 1/1996 | Tew | 250/551 |
| 5,319,789 | 6/1994 | Ehlig et al. | 395/800 | 5,482,564 | 1/1996 | Douglas et al. | 134/18 |
| 5,319,792 | 6/1994 | Ehlig et al. | 395/800 | 5,482,818 | 1/1996 | Nelson | 430/394 |
| 5,321,416 | 6/1994 | Bassett et al. | 345/8 | 5,483,307 | 1/1996 | Anderson | 353/98 |
| 5,323,002 | 6/1994 | Sampsell et al. | 250/502.1 | 5,485,172 | 1/1996 | Sawachika et al. | 345/8 |
| 5,325,116 | 6/1994 | Sampsell | 346/108 | 5,485,304 | 1/1996 | Kaeriyama | 359/291 |
| 5,327,286 | 7/1994 | Sampsell et al. | 359/561 | 5,485,354 | 1/1996 | Ciupke et al. | 362/31 |
| 5,330,878 | 7/1994 | Nelson | 430/311 | 5,486,698 | 1/1996 | Hanson et al. | 250/332 |
| 5,331,454 | 7/1994 | Hornbeck | 359/224 | 5,486,841 | 1/1996 | Hara et al. | 345/8 |
| 5,339,116 | 8/1994 | Urbanus et al. | 348/716 | 5,486,946 | 1/1996 | Jachimowicz et al. | 359/263 |
| 5,339,177 | 8/1994 | Jenkins et al. | 359/35 | 5,488,431 | 1/1996 | Gove et al. | 348/716 |
| 5,345,521 | 9/1994 | McDonald et al. | 385/19 | 5,489,952 | 2/1996 | Gove et al. | 348/771 |
| 5,347,321 | 9/1994 | Gove | 348/663 | 5,490,009 | 2/1996 | Venkateswar et al. | 359/291 |
| 5,347,378 | 9/1994 | Handschy et al. | 359/53 | 5,491,510 | 2/1996 | Gove | 348/77 |
| 5,347,433 | 9/1994 | Sedlmayr | 362/32 | 5,491,715 | 2/1996 | Flaxl | 375/344 |
| 5,348,619 | 9/1994 | Bohannon et al. | 156/664 | 5,497,172 | 3/1996 | Doherty et al. | 345/85 |
| 5,349,687 | 9/1994 | Ehlig et al. | 395/800 | 5,497,197 | 3/1996 | Gove et al. | 348/388 |
| 5,351,052 | 9/1994 | D'Hont et al. | 342/42 | 5,497,262 | 3/1996 | Kaeriyama | 359/223 |
| 5,357,369 | 10/1994 | Pilling et al. | 359/462 | 5,499,060 | 3/1996 | Gove et al. | 348/651 |
| 5,359,349 | 10/1994 | Jambor et al. | 345/168 | 5,499,062 | 3/1996 | Urbanus | 348/771 |
| 5,363,220 | 11/1994 | Kuwayama et al. | 359/3 | 5,500,761 | 3/1996 | Goossen et al. | 359/290 |
| 5,365,283 | 11/1994 | Doherty et al. | 348/743 | 5,502,481 | 3/1996 | Dentinger et al. | 348/51 |
| 5,367,585 | 11/1994 | Ghezzo et al. | 385/23 | 5,504,504 | 4/1996 | Markandey et al. | 345/214 |
| 5,371,543 | 12/1994 | Anderson | 348/270 | 5,504,514 | 4/1996 | Nelson | 347/130 |
| 5,371,618 | 12/1994 | Tai et al. | 359/53 | 5,504,575 | 4/1996 | Stafford | 356/330 |
| 5,382,961 | 1/1995 | Gale, Jr. | 345/108 | 5,504,614 | 4/1996 | Webb et al. | 359/223 |
| 5,387,924 | 2/1995 | Gale, Jr. et al. | 345/108 | 5,506,171 | 4/1996 | Leonard et al. | 437/187 |
| 5,389,182 | 2/1995 | Mignardi | 516/344 | 5,506,597 | 4/1996 | Thompson et al. | 345/85 |

| | | | |
|---|---|---|---|
| 5,506,720 | 4/1996 | Yoon | 359/224 |
| 5,508,750 | 4/1996 | Hewlett et al. | 348/558 |
| 5,508,840 | 4/1996 | Vogel et al. | 359/291 |
| 5,508,841 | 4/1996 | Lin et al. | 359/318 |
| 5,510,824 | 4/1996 | Nelson | 347/239 |
| 5,512,374 | 4/1996 | Wallace et al. | 428/422 |
| 5,512,748 | 4/1996 | Hanson | 250/332 |
| 5,515,076 | 5/1996 | Thompson et al. | 345/139 |
| 5,516,125 | 5/1996 | McKenna | 279/3 |
| 5,517,340 | 5/1996 | Doany et al. | 359/41 |
| 5,517,347 | 5/1996 | Sampsell | 359/224 |
| 5,517,359 | 5/1996 | Gelbart | 359/623 |
| 5,519,450 | 5/1996 | Urbanus et al. | 348/600 |
| 5,523,803 | 6/1996 | Urbanus et al. | 348/771 |
| 5,523,878 | 6/1996 | Wallace et al. | 359/290 |
| 5,523,881 | 6/1996 | Florence et al. | 359/561 |
| 5,524,155 | 6/1996 | Weaver | 385/24 |
| 5,539,422 | 7/1996 | Heacock et al. | 345/8 |
| 5,623,361 | 4/1997 | Engle | 359/291 |
| 5,704,700 | 1/1998 | Kappel et al. | 353/31 |
| 5,742,373 | 4/1998 | Alvelda | 349/204 |
| 5,757,536 | 5/1998 | Ricco et al. | 359/224 |
| 5,768,009 | 6/1998 | Little | 359/293 |
| 5,926,309 | 7/1999 | Little | 359/293 |
| 5,949,570 | 9/1999 | Shiono et al. | 359/291 |

FOREIGN PATENT DOCUMENTS

| | | | |
|---|---|---|---|
| 0 488 326 A3 | 6/1992 | European Pat. Off. | G09G 3/28 |
| 0 530 760 A2 | 3/1993 | European Pat. Off. | G09G 3/34 |
| 0 610 665 A1 | 8/1994 | European Pat. Off. | G09G 3/34 |
| 0 627 644 A2 | 12/1994 | European Pat. Off. | G02B 27/00 |
| 0 627 850 A1 | 12/1994 | European Pat. Off. | H04N 5/64 |
| 0 643 314 A2 | 3/1995 | European Pat. Off. | G02B 27/00 |
| 0 654 777 A1 | 5/1995 | European Pat. Off. | G09G 3/34 |
| 0 658 868 A1 | 6/1995 | European Pat. Off. | G09G 3/34 |
| 63-305323 | 12/1988 | Japan | G09F 1/13 |
| 2-219092 | 8/1990 | Japan | G09G 3/28 |
| 2 118 365 | 10/1983 | United Kingdom | H01L 27/13 |
| 2 266 385 | 10/1993 | United Kingdom | G02B 23/10 |
| WO 92/12506 | 7/1992 | WIPO | G09F 9/37 |
| WO 93/02269 | 2/1993 | WIPO | E06B 5/10 |
| WO 93/09472 | 5/1993 | WIPO | G03F 7/20 |
| WO 93/18428 | 9/1993 | WIPO | G02B 7/00 |
| WO 95/11473 | 4/1995 | WIPO | G02B 27/00 |
| WO 96/08031 | 3/1996 | WIPO | H01J 29/12 |

OTHER PUBLICATIONS

R. Apte, F. Sandejas, W. Banyai, D. Bloom, "Grating Light Valves For High Resolution Displays", Ginzton Laboratories, Stanford University, Stanford, CA 94305–4085, Jun., 1994.

R. Apte, "Grating Light Valves For High Resolution Display," Jun., 1994.

O. Solgaard, "Integrated Semiconductor Light Modulators For Fiber–Optic And Display Applications," Feb., 1992.

J. Neff, "Two–Dimensional Spatial Light Modulators: A Tutorial", Proceedings of the IEEE, vol. 78, No. 5, pp. 826–855, May, 1990.

Gerhard–Multhaupt, "Viscoelastic Spatial Light Modulators and Schlieren–Optical Systems for HDTV Projection Displays", SPIE vol. 1255 Large Screen Projection Displays II, pp. 69–78, 1990.

Gerhard–Multhaupt, "Light–Valve Technologies for High–Definition Television Projection Displays", Displays, vol. 12, No. 3/4, pp. 115–128, 1991.

Alvelda et al., "Ferroelectric Microdisplays Using Distortion–Compensated Pixel Layouts," SID 95 Digest, pp. 931–933, 1995.

Phillip Alvelda, "High–Efficiency Color Microdisplays," SID 95 Digest, pp. 307–311, 1995.

Worboys et al., "Miniature Display Technology for Integrated Helmut Systems," GEC Journal of Research, vol. 10, No. 2, pp. 111–118, 1993.

Farn et al., "Color Separation by use of Binary Optics," Optics Letters, vol. 18:15, pp. 1214–1216, 1993.

Phillip Alvelda, "VLSI Microdisplays and Optoelectric Technology," MIT, pp. 1–93, 1995.

Phillip Alvelda, "VLSI Microdisplay Technology," Oct. 14, 1994.

F. Sandejas, R. Apte, W. Banyai, D. Bloom, "Surface Microfabrication of Deformable Grating Light Valves For High Resolution Displays," The 7th International Conference on Solid–State Sensors and Actuators, pp. 6 & 7, (no date).

O.Solgaard, F. Sandejas, and D. Bloom, "Deformable Grating Optical Modulator," Optics letters, vol. 17, No. 9, New York, USA, pp. 688–690, May 1, 1992.

R. N. Thomas, et al., "The Mirror–Matrix Tube: A Novel Light Valve for Projection Displays", IEEE Transactions on Electron Devices, vol. ED–22, No. 9, pp. 765–775, Sep. 1975.

J. Guldberg, et al., "An Aluminum/SiO2/Silicon–on–Sapphire Light Valve Matrix for Projection Displays," Applied Physics Letters, vol. 26, No. 7, pp. 391–393, Apr. 1975.

DISPLAY APPARATUS INCLUDING GRATING LIGHT-VALVE ARRAY AND INTERFEROMETRIC OPTICAL SYSTEM

TECHNICAL FIELD OF THE INVENTION

The present invention relates in general to display systems including spatial light-modulator devices. It relates in particular to a miniature display system wherein light is incident on spatial light-modulator formed from an array of grating light-valves which phase-modulate a wavefront incident thereon, the phase-modulated wavefront being interferometrically combined with a reference wavefront to provide the display.

DISCUSSION OF BACKGROUND ART

Miniature display devices are useful in applications such as portable displays for video simulation applications, among others. A miniature display in the context of this discussion is understood to be a display sufficiently small that it requires an optical magnification arrangement to be effective. An advantage of such a display is that it consumes less power than a conventional display having real dimensions equal to the apparent dimensions of the magnified miniature display.

A particularly effective device for use as a spatial light modulating component in a miniature display system is a reflective grating light-valve (GLV) array. Such displays are described in detail in U.S. Pat. No. 5,459,610. This type of reflective grating light-valve array is capable of providing displays of very high resolution, very high switching speeds and high bandwidth by virtue a the very small size (about 1×40 micrometers) of operable elements of the array. The very small operable elements can be operated electrostatically with low applied voltage, such that, in combination with diode laser illumination and appropriate optics, it is potentially feasible to build a palm-sized projection display powered by (Q) dry cell batteries.

A significant problem in designing such a display system arises from the fact that the GLV array modulates light by diffraction, and light incident on the array for modulation is returned as a combination of reflected and diffracted beams. Because of this, an optical system used with the display must be capable, not only of magnifying, focussing or projecting an image of the GLV array to form a displayed image, but must also be capable of separating the diffracted light from the reflected light.

A most optical arrangement for providing separation of the diffracted and reflected light is known as Schlieren optics. Schlieren optics make use of the fact that light which is diffracted from a GLV array leaves the GLV array at a different angle from light which is reflected from the array. The light may be diffracted at different angle depending on the diffraction order. Typically, the first (brightest) order is used for forming a displayed image. The schlieren optics system can be arranged such that at certain points in the system for example at pupil positions, the diffracted and reflected rays can be physically separated. This allows the reflected light to be intercepted by a stop, thereby permitting, in theory at least, only the diffracted light to pass the stop for providing the display image.

There are several problems inherent in a schlieren optics system. For example, the requirement for separating diffracted light makes illumination of the GLV array for providing the diffracted light somewhat inefficient. It is also difficult to make a stop one-hundred percent effective in intercepting the reflected light, because of practical limitations (aberrations) of the optics. Any reflected which passes the stop is, in effect, stray light, which has the effect of reducing image contrast. Stray light can also be contributed by ghost reflections from optical surfaces. These ghost reflections are not direct by the optical system towards the stop. Problems in separating reflected and diffracted light are also created by dispersion of diffracted light and by unwanted diffracted orders.

There is an need for an alternate approach to forming a display using a GLV device. The approach should not rely on physical separation of diffracted and reflected light from the GLV array for forming an image.

SUMMARY OF THE INVENTION

The present invention is directed to providing a display device based on GLV array (spatial light-modulator). The system does not require schlieren optics to separate reflected and diffracted light. The display system comprises GLV array including a plurality of rows of elongated, spaced-apart, parallel-aligned, moveable reflective-members. Each of the moveable reflective-members is individually moveable with respect to a grating plane, through planes parallel to the grating plane, to an extent corresponding to an element of the image to be displayed. The image is displayed, at any instant in time, as an interferogram image of the GLV array.

In one aspect, the system includes a first optical arrangement for providing a first, phase-constant optical-wavefront. A second optical arrangement, including the GLV array, forms the first optical-wavefront into a second optical-wavefront which is spatially phase-modulated by the moveable reflective-members of the GLV array, and a third, phase-constant optical-wavefront. A third optical arrangement forms first and second images of respectively the second and third optical-wavefronts, and the second and third optical arrangements are configured such that the first and second images interferentially combine to provide the image to be displayed.

In one embodiment of the present invention the second and third optical arrangements form, in effect, a Michelson type interferometer. The third wavefront is a reference wavefront of the interferometer and is formed by reflecting a portion of the first optical wavefront off a reference mirror.

In another embodiment of the present invention, the second and third optical arrangements form in effect a wavefront-shearing interferometer. The GLV array has a row of spaced-apart fixed reflective-members in every row of moveable reflective-members. The fixed reflective-members are located in a plane parallel to the grating plane, spaced-apart by the same distance as the moveable reflective-members, and laterally arranged such that each thereof is in a lateral position between adjacent ones of the moveable reflective-members.

The second optical arrangement causes the first optical-wavefront to be reflected from the GLV array, then divides the reflected wavefront into two complex optical-wavefronts, each thereof including phase-constant and phase-modulated portions corresponding to respectively the fixed and moveable reflective-members of the GLV array. The second optical arrangement causes the complex optical-wavefronts to propagate axially, laterally displaced one from the other by a distance equal to a whole multiple of a spacing between reflective-members, such that phase-modulated portions of the complex optical wavefronts combine to form the second optical wavefront and phase-constant portions of the complex optical wavefronts combine to form the second optical wavefront.

Images produced by the system of the present invention may be magnified real images projected on a viewing surface such as a screen. The images may also be magnified virtual images directly viewable by a viewer via the third optical arrangement.

The display system of the present invention is designed primarily for use with a two-dimensional GLV array for producing, directly therefrom, a corresponding two dimensional image. The system, however, is applicable for use with a one-dimensional GLV array. In this case, a scanning device cooperative with the third optical arrangement, and with modulator circuitry for operating the GLV array, is provided for sweeping a one-dimensional image corresponding to the one-dimensional GLV array rapidly through the field of a viewer to represent sequential lines of a two-dimensional array.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain the principles of the invention.

FIG. 4 is a general cross-section view schematically illustrating one preferred embodiment of a monochromatic display system in accordance with the present invention based on a Michelson interferometer principle, and arranged for projecting a real image on a screen or the like.

FIG. 12B is a general cross-section view, seen generally in the direction 12—12 of FIG. 12, schematically illustrating yet another aspect of the scanning, monochromatic display system of FIG. 12, wherein the system is arranged for projecting a real image on a screen or the like.

DETAILED DESCRIPTION OF THE INVENTION

Figure 1:
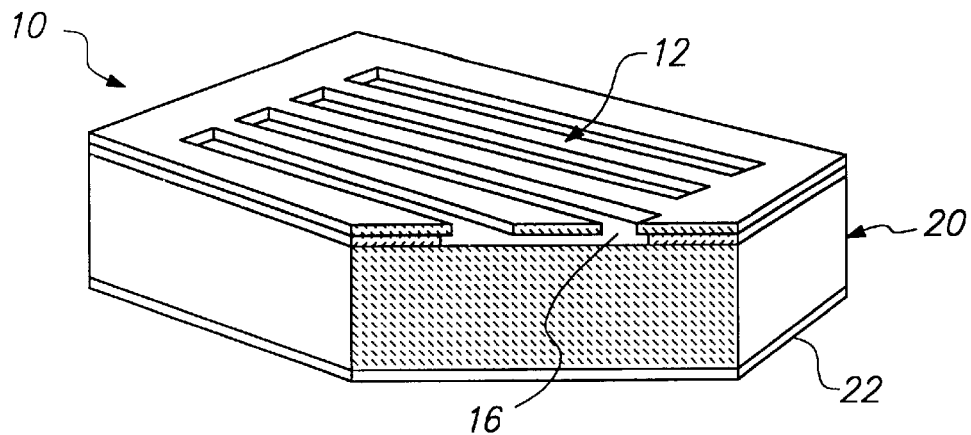
FIG. 1 is a fragmentary perspective view, schematically illustrating a portion of a prior-art planar reflective grating light-valve array, suitable for use in a display system in accordance with the present invention, including arrays of fixed and moveable reflective-members arranged in planes parallel to the grating plane.

In a display system in accordance with the present invention, a particularly preferred light modulating device is a reflective grating light-valve (GLV) array. Use of such devices in real two-dimensional arrays for making displays has been proposed, and devices are described in detail in U.S. Pat. No. 5,459,610, the disclosure of which is hereby incorporated by reference. This type of reflective grating light-valve array is capable of providing displays of very high resolution, by virtue of very small feature or element size, very high switching speeds, and high bandwidth. Turning now to the drawings, wherein like components are designated by like reference numerals, a brief description of one embodiment of such a device is set forth below with reference to FIGS. 1, 2, and 3.

FIG. 1 illustrates a portion 10 of a reflective grating light-valve array, which, for reasons of scale, is not depicted in its entirety. GLV array 10 includes rows of individually moveable elongated members or ribbons 12 including a reflective coating 14 (see FIG. 2). Ribbons 12 in a non-operated state (see FIG. 2) are suspended (in tension) over a base 16 in a plane 17 parallel thereto. Ribbons 12 are spaced apart and parallel to each other. Laterally aligned with spaces between members 12, and having about the same spacing thereas, are fixed reflective-members 18, formed by depositing a reflective coating on base 16. Fixed reflective-members can be defined as lying in a plane 19 parallel to base 16.

GLV array 10 is fabricated using lithographic semiconductor device fabrication techniques on a silicon (wafer) substrate 20. Base 16 is one surface of the wafer. An electrode layer 22 is deposited on an opposite surface of the wafer. Ribbons 12 and fixed reflective-members preferably have a width between about one and four micrometers ($\mu$m) and a length between about 40.0 $\mu$m and 100.0 $\mu$m. A GLV array suitable for use in a two-dimensional display in accordance with the present invention preferably has a width of about (Q) centimeter (cm), and a height of about (Q). Such an array would include about (Q) moveable members 12, per row, and a number of rows corresponding to the number of lines in the image to be displayed. The narrow width of the fixed and moveable members is such that a group of adjacent members, for example, a group of eight fixed and moveable member pairs, can be used to represent one image-element or pixel, in one of two-hundred-fifty-six grey shades, while still providing a pixel small enough to provide resolution comparable to a conventional CRT computer monitor.

A ribbon 12 is moved or operated by applying a potential between the member and base 16. In a non-operated state, the distance between reflective coating 14 of the moveable member, and a corresponding (adjacent) fixed member 18, is set to one-half wavelength of light which is used to illuminate the array (see FIG. 2).

When a sufficient potential is applied, a ribbon 12 is deflected towards and can be held on base 16. The thickness of ribbons 12 is selected such that in this "operated and held" state, the distance between reflective surfaces of corresponding fixed and moveable members is one-quarter wavelength of light which is used to illuminate the array (see FIG. 3). In this state, destructive interference between light reflected from moveable and fixed members creates diffracted wavefronts (not shown). In the present invention however, the diffracted wavefronts are not of interest, image information being derived from the effect of the moveable elements in phase modulating an incident "perfect" or phase-constant wavefront 24.

Any adjacent pair of moveable and fixed members 12 and 18, or any functional group of such pairs, representing all or part of an image element, may be considered to be a "light-valve". It is from this consideration that the terminology grating light-valve array is adopted for purposes of this description.

Figure 2:
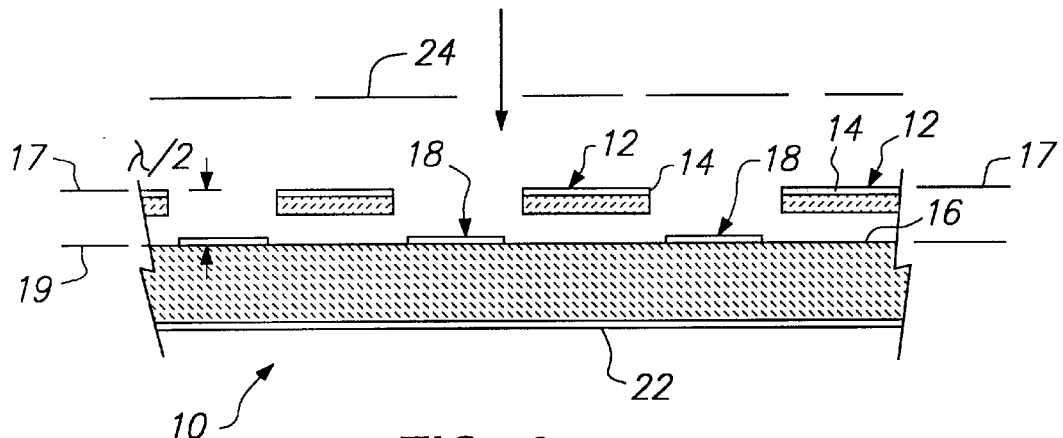
FIG. 2 is a general cross-section view schematically illustrating an operational state of the grating light-valve array portion of FIG. 1, wherein the moveable reflective-members are in a plane separated by one-half wavelength of incident light from a plane including the fixed reflective-members.
Figure 3:
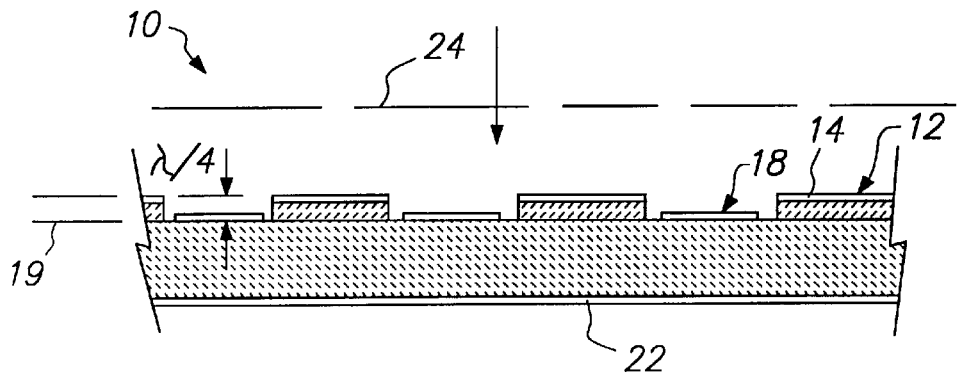
FIG. 3 is a general cross-section view schematically illustrating an operational state of the grating light-valve array portion of FIG. 1, wherein the moveable reflective-members are in a plane separated by one-quarter wavelength of incident light from a plane including the fixed reflective-members.

Those familiar with the art to which the present invention pertains will recognize that ribbons 12 move through planes parallel to base 16 (or any grating plane) in states between the extreme states illustrated in FIGS. 2 and 3. Intermediate states may be used to operate the members in an analog manner.

Figure 4:
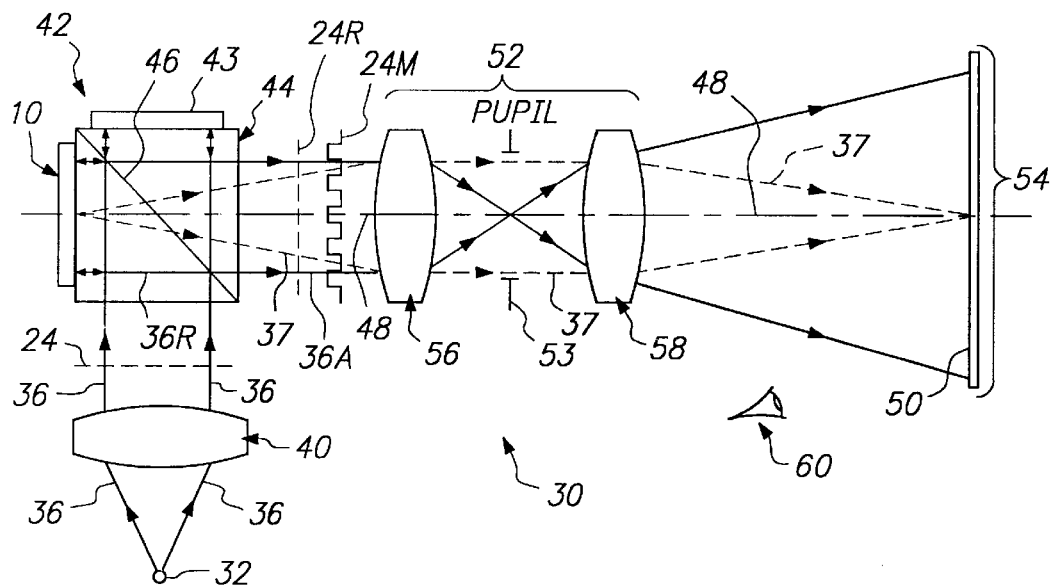

Referring now to FIG. 4, one preferred embodiment 30 of a display system in accordance with the present invention is illustrated. This system is suitable for forming a monochrome display. System 30 includes a light source 32 preferably a "monochromatic" light source, for example, a semiconductor light emitting device such as a light emitting diode or laser. The term monochromatic here meaning that light emitted from source 32 is restricted to wavelengths in a narrow band around a nominal center wavelength, the band being sufficiently narrow that it will have no significant adverse effect on optical interference between co-propagating wavefronts, on which principle systems in accordance with the present invention are based.

Light 36 from source 32 is collimated by lens 40 and can be thus described as having been formed into a perfect plane or "phase-constant" wavefront indicated whimsically in FIG. 4 by broken line 24. Phase-constant, here, meaning that all points on the wavefront are essentially in-phase with each other. Practitioners of the optical art will recognize that essentially, here, means that phase-constancy is only possible to a degree permitted by the optical accuracy of optical elements forming or directing the wavefront. Lens 40 is illustrated in FIG. 4, for simplicity as a single element. Those familiar with the optical art will recognize however that lens 40 typically would include two or more elements. The degree of perfection of wavefront 24, of course, depending on the selection of element materials and shapes of lens 40.

Wavefront 24 (collimated light 36) then enters an optical arrangement 42 including a GLV array 10, a reference mirror 43, and a cube-beamsplitter 44 having a forty-five degree reflecting surface 46. Surface 46 includes a filter coating (not shown) which partially transmits and partially reflects light 36. Transmission and reflection are preferably arranged to be about equal. This partial transmission and partial transmission of light 36 can be defined as dividing wavefront 24 into two portions. The reflected portion as indicated by arrows 36R is incident on GLV 10. The transmitted portion as indicated by arrows 36T is incident on reference mirror 43. Reference mirror 43 has a reflecting surface (not specifically indicated in FIG. 4) which is preferably sufficiently flat that it does not significantly aberrate the phase of a wavefront incident thereon. Thus a phase-constant reference wavefront 24R reflected from mirror 43 and surface 46 emerges from beamsplitter cube 44. Alternatively, mirror 43 could be replaced by reflectively coating the face of beamsplitter cube 44 to which it is optically adjacent.

After a portion of wavefront 40 reflected from surface 46 has been reflected from GLV 10, points over the wavefront will have a different phase relationship depending on the operating state of moveable elements 12 of GLV 10 from which these points were reflected. Accordingly, in most operational circumstances, i.e., when an image is being generated by GLV 10, a phase-modulated wavefront 24M emerges from beamsplitter cube 44 and propagates along a system axis 48 together with phase-constant, reference wavefront 24R.

When wavefronts 24R and 24M are imaged onto a viewing surface, such as screen 50, by an image-forming optical arrangement 52, the wavefronts will optically interfere with each other (interferentially combine) resulting in a real image 54 which is an interference pattern or interferogram image of GLV 10, wherein bright or dark portions are representative of the operating state of moveable members 12 of the GLV. Thus by providing suitable electronic circuitry and software (not shown in FIG. 4) for operating GLV 10, image 54 can be made to represent essentially any video or graphic image, whether directly generated by the software or transformed thereby from a separate video source, such as a camera or VCR.

It should be noted here that the term "image" as used in this description and appended claims should be interpreted as meaning an image at any instant in time, except where that is clearly not the case. This recognizes the fact that so-called "moving" images and many "still" images are formed from a rapidly presented sequence of such instantaneous images, and avoids tedious and unecessary repetition of that fact.

Preferably system 30 is initially "calibrated" with GLV 10 in a state when all moveable members thereof are in one extreme position or the other. Preferably this state is a state in which moveable elements are all "up", i.e., no potential is applied (see FIG. 2). In this condition, fixed and moveable reflective-members are separated by one-half wavelength, leading to a round trip phase change of one wavelength between portions of a wavefront incident on moveable and fixed reflective-members. In this condition, wavefront 24M would appear to be a phase-constant wavefront, as is wavefront 24R. By adjusting the tilt (attitude) of GLV 10 such that the wavefronts are parallel, and then adjusting the axial position such that the wavefronts (entirely) have a phase difference between them of some odd or even number of half-wavelengths, image 54 can be made to appear all dark or all bright respectively. If, for example, an "all dark" condition is selected, subsequent operation of GLV 10 to provide a graphic or video image will produce an image consisting or bright dots on a dark background.

Continuing now with reference to FIG. 4, a discussion of optical arrangements for image forming is presented. In one preferred arrangement, image forming optics 52 include lenses 56 and 58. As in the case of lens 40, these lenses are illustrated for simplicity as single elements, but would, in practice, each include two or more elements. For imaging purposes, GLV 10 can be considered an object and any individual member of GLV 10 or point thereon can be considered as emitting a cone of rays by broken lines 37 diverging as they leave the GLV. GLV 10 is placed in a focal plane of lens 56, such that rays 37 are collimated after passing through the lens. Paraxial rays 36A, viz., those rays which collectively are reflected from GLV 10 and reference mirror 43 are brought to a focus by lens 56 at an exit pupil 53 thereof and then diverge toward lens 58 and then are redirected toward screen 50 by lens 58. Lens 58 brings rays 37 to a focus on screen 50. Real image 54 on screen 50 can be viewed by a viewer at any convenient location with respect to the screen as illustrated by eye 60R.

While system 30 is described above as a projection system with optical arrangement 52 for projecting a real image 54 on screen 50, the system can be arranged for direct viewing by simply omitting lens 58 from optical arrangement 52. This is illustrated (system 31) in FIG. 5, wherein optical arrangement 52A now includes only lens 56, and a viewers eye 60V, placed at or close to pupil 53 and directed toward the lens, would see an interferential combination of virtual images (at infinity) of wavefronts 24R and 24M. This interferential combination of virtual images would represent the image to be displayed by system 31 in virtual form.

Figure 6:
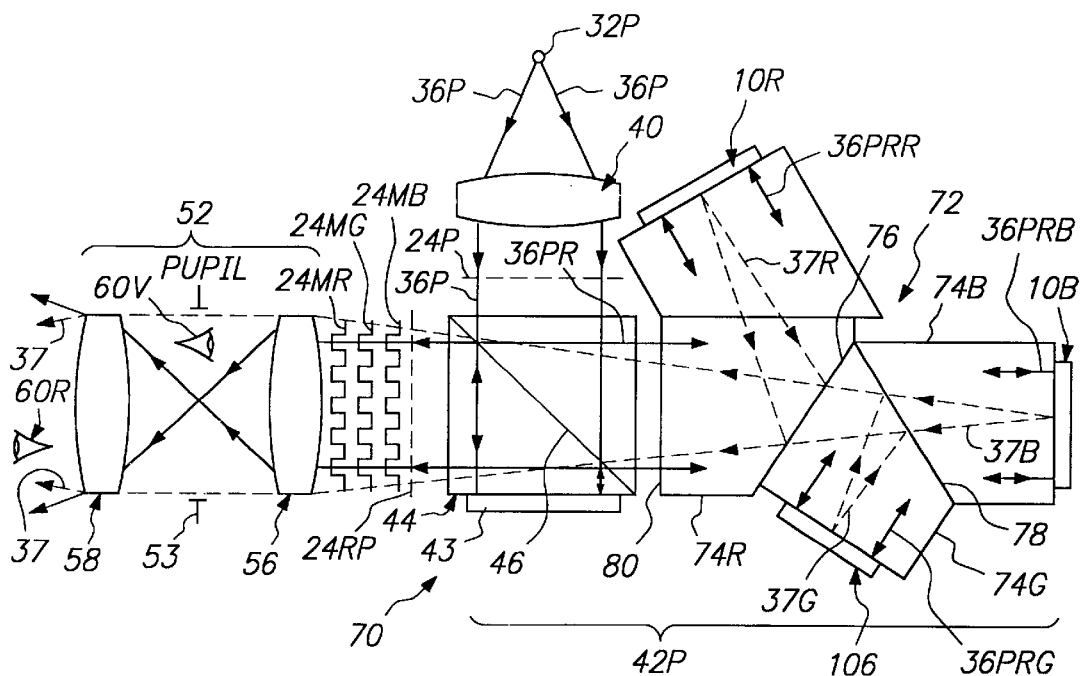
FIG. 6 is a general cross-section view schematically illustrating a third preferred embodiment of a polychromatic display system in accordance with the present invention based on a Michelson interferometer principle, including a polychromatic light source, three GLV arrays, and a Philips prism arrangement for illuminating each of the GLV arrays with light of a particular primary color.

While the display system of the present invention has been described above in terms of a monochromatic display system, principles of the present invention are equally applicable to providing a polychromatic (multicolored or "full-colored") display. One such polychromatic display system 70 is illustrated in FIG. 6. Here, light 36P from polychromatic source 32P is collimated by lens 40. Light 36P includes all primary color components, i.e., red, green, and blue. Lens 40 directs a plane wavefront 24P, including all of these primary color components, into an optical arrangement 42P.

Optical arrangement 42P includes a beamsplitter cube 44 having a forty-five degree, partially-reflective, partially-transmissive, surface 46. A reference mirror 43 is adjacent beamsplitter cube 44 as described above for monochromatic system 30. After collimated light 36P is reflected from surface 46 it is directed into an array 72 of color separating prisms 74R, 74G and 74B which direct light to three GLV arrays, 10R, 10G and 10B, one for modulating each primary color component in a final image to be displayed. Each GLV array, of course, is constructed in the same manner as GLV 10 of system 30. Each GLV is individually adjustable for providing image "calibration", as discussed above for system 30. Surface 76 of prism arrangement 72 is filter coated to reflect red and transmit blue and green. Surface 78 of prism arrangement 72 is filter coated to reflect green and transmit blue.

Those skilled with the art to which the present invention pertains will recognize prism arrangement 72 as a well-known, Philips-prism arrangement. The objective of prism arrangement 72 is to place each of GLV arrays 10R, 10G, and 10B at the same optical distance from entrance/exit surface 80 of the prism arrangement. It should be noted here that Philips-prism arrangement 72 is but one of several such arrangements which can achieve this objective, and which would be known by one skilled in the art. Accordingly, prism arrangement 72, should not be construed as limiting the present invention.

GLV arrays 10R, 10G, and 10B are illuminated by, respectively, collimated beams 36PRR, 36PRG, and 36 PRB. For imaging purposes it can be considered that the GLV arrays provide red, green, and blue diverging beams 37R, 37G, and 37B. This creates three (red, green and blue respectively) phase-modulated wavefronts 24MR, 24MG, and 24MB to be imaged by imaging optics 52. In addition, a polychromatic, phase-constant, reference wavefront 24RP is created by reflection of a portion of light 36P from reference mirror 43 and surface 46 of beamsplitter cube 44. Imaging optics 32 are arranged, as discussed above with reference to system 30, to image wavefronts 24MR, 24MG, 24MB, and 24RP as real images onto a screen (not shown in FIG. 6, but implied by eye 60R) where they interferentially combine to form the polychromatic image to be displayed as a real image. Similarly, as in above-discussed system 31, optical arrangement 52 may include only lens 56, and a viewer's eye 60V may directly view a virtual interferential combination of wavefronts 24MR, 24MG, 24MB, and 24RP representing the polychromatic image to be displayed as virtual image.

Figure 7:
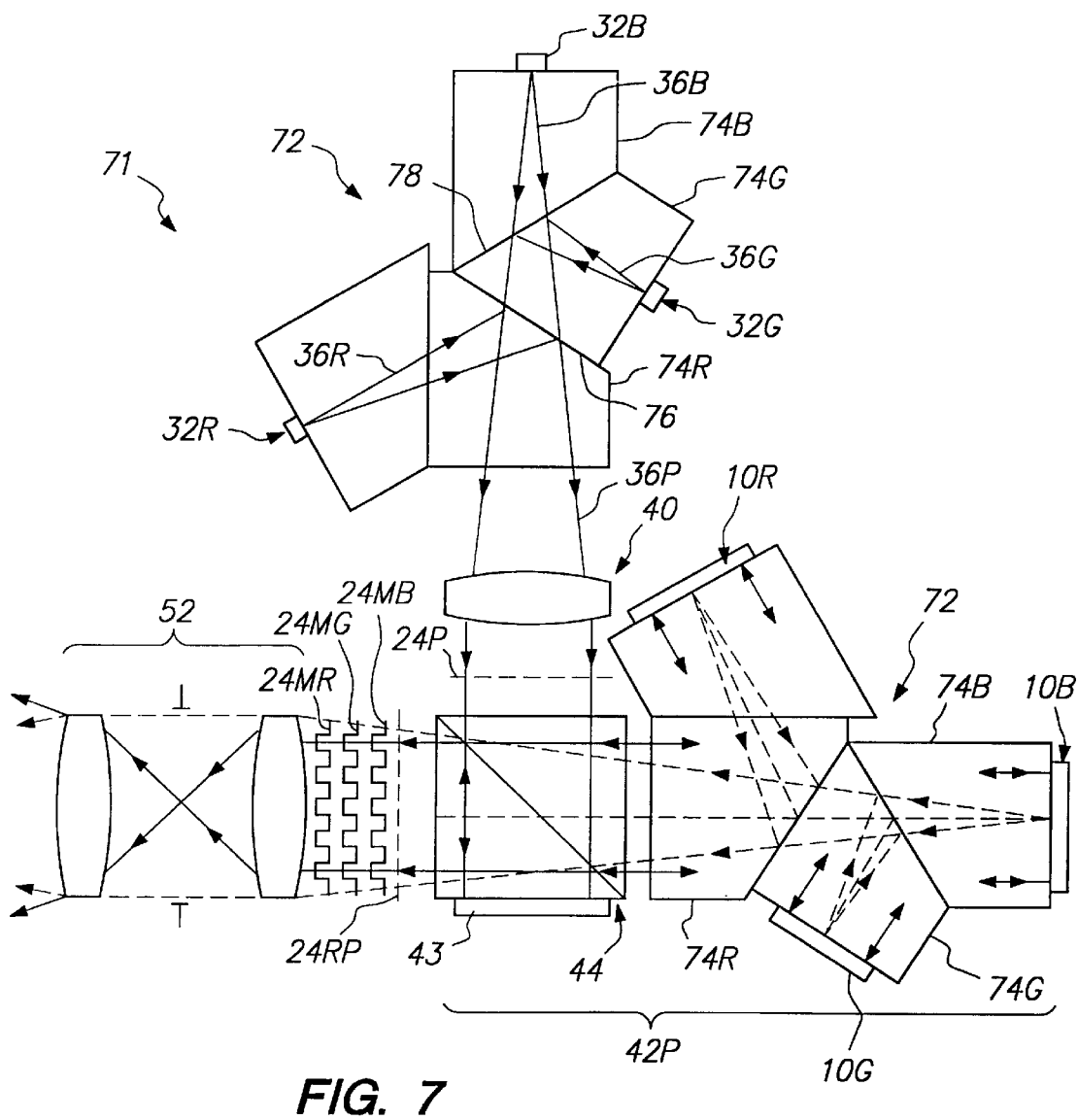
FIG. 7 is a general cross-section view schematically illustrating a fourth preferred embodiment of a polychromatic projection display system in accordance with the present invention based on a Michelson interferometer principle, including three light sources and three GLV arrays, one thereof for each of red, green and blue primary color components, corresponding light sources and GLVs optically connected by two corresponding Philips prism arrangements, and a single lens collimating light from all three light sources.

Referring now to FIG. 7, another example 71 of a polychromatic or multicolor display system is illustrated. System 71 is essentially identical in configuration to above-described system 70, with the exception that polychromatic light source 32P has been replaced by three separate, monochromatic, red, green, and blue light sources 32R, 32G, and 32B respectively. Red 36R, green 36G, and blue 36B light from theses sources is directed by a Philips-prism arrangement 72 into lens 40 for collimation. Polychromatic, phase-constant wavefront 24P emerges from lens 40. Those skilled in the optical art will recognize, of course that polychromatic wavefront 24P can also be regarded as separate, phase-constant red, green and blue wavefronts, while preserving the interferometric principle of the present invention.

Figure 8:
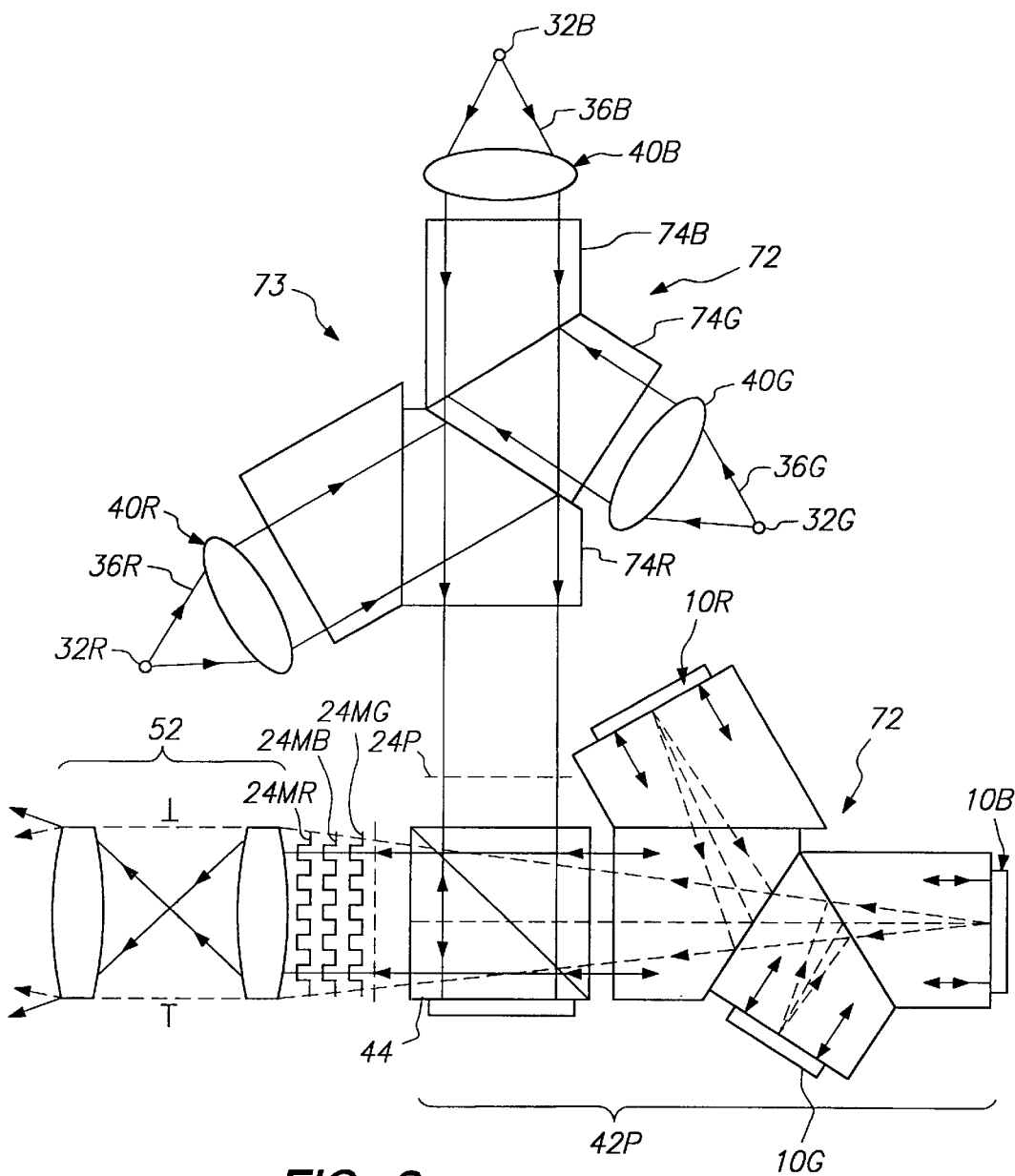
FIG. 8 is a general cross-section view schematically illustrating a fifth preferred embodiment of a polychromatic projection display system in accordance with the present invention based on a Michelson interferometer principle, including three light sources and three GLV arrays, one thereof for each of red, green and blue primary color components, corresponding light sources and GLVs being optically connected by two corresponding Philips prism arrangements, and each of the light sources having a dedicated collimating lens.

Those skilled in the optical art will also recognize that if monochromatic light sources 32R, 32G, and 32B are semiconductor diode lasers, the output characteristics of each of the sources, which is typically elliptical and astigmatic, may be different enough from the others that a single lens system 40 would be unable to properly circularize and collimate (anastigmatically correct) for all three sources. Such a situation could be handled, as illustrated in FIG. 8, by a system 73, essentially identical in operation to above discussed system 71, but wherein lens 40 of system 71 has been replaced with three separate lenses 40R, 40G, and 40B. These lenses are specifically designed to circularize and collimate the output of light sources 32R, 32G, and 32B. Collimated light from lenses 40R, 40G, and 40B is directed into a Philips-prism arrangement 72, and combined to form a collimated polychromatic light output indicated in FIG. 8 as polychromatic, phase-constant, wavefront 24P. This wavefront, of course, can also be considered as separate, phase-constant red, green and blue wavefronts while preserving the interferometric principle of the present invention.

It will be evident to one skilled in the art that any of the above-described display systems, even the most complicated thereof, and whether the image is real or virtual, can be regarded as an imaging Michelson-interferometer, in which an optical surface being "tested" is the surface of GLV array 10. Systems in accordance with the present invention or not restricted, however, to using the Michelson-interferometer principle but may use other interferometric principles as exemplified in a description set forth below.

Figure 9A:
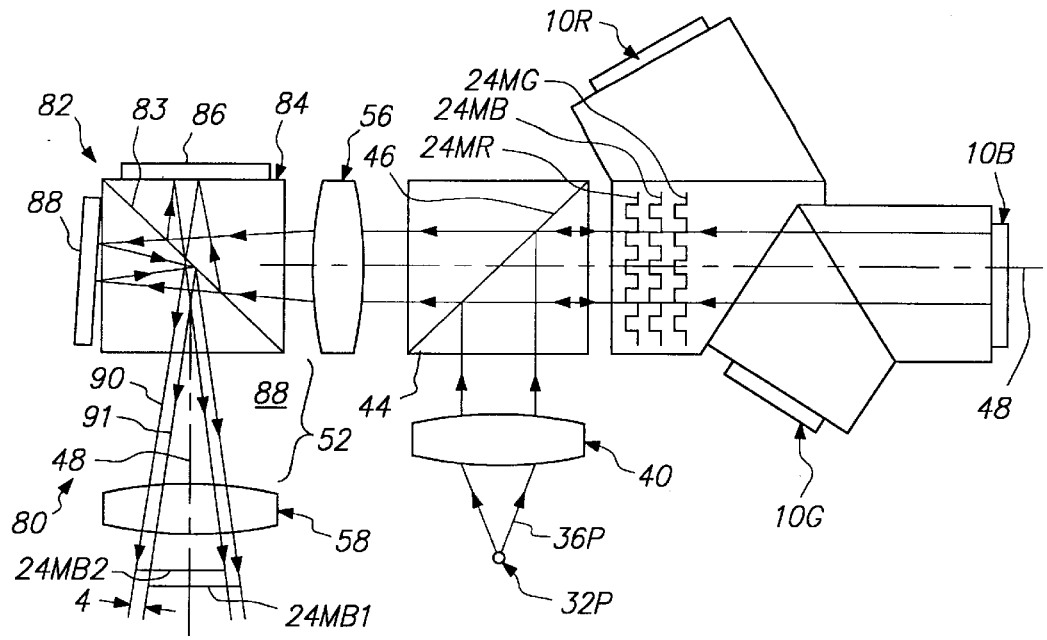
FIGS. 9A and 9B are general cross-section views schematically illustrating two ray-trace aspects of a sixth preferred embodiment of a polychromatic projection display system in accordance with the present invention based on a wavefront-shearing interferometer principle.
Figure 9B:
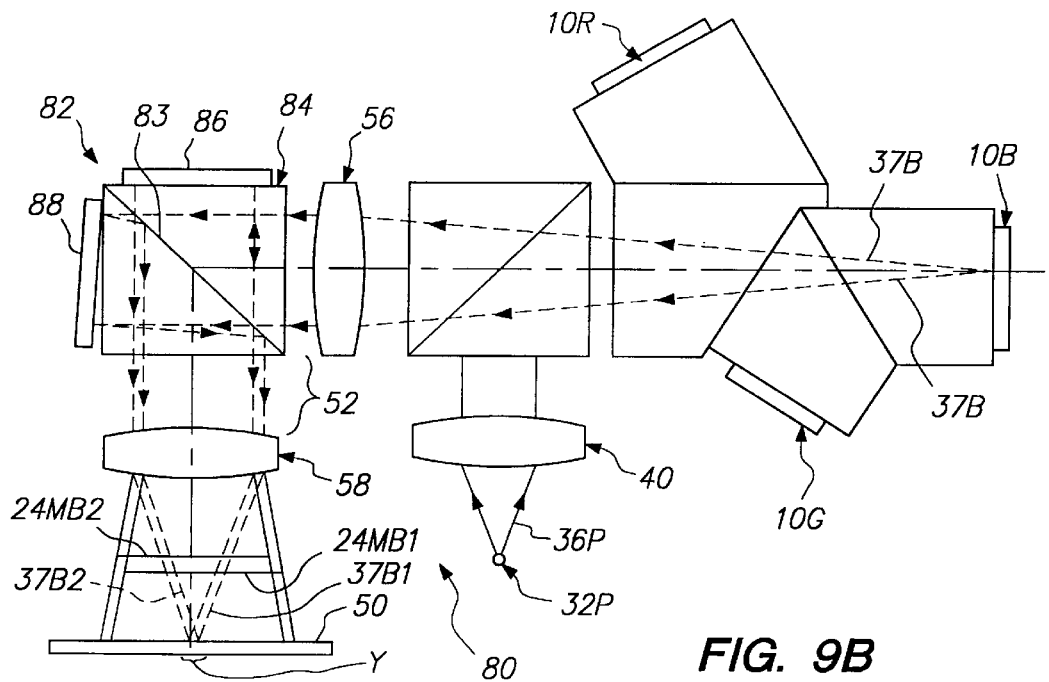

Referring now to FIGS. 9A and 9B, an embodiment 80 of a polychromatic projection display system employing a wavefront-shearing interferometer principle is illustrated. As system 80, differs from foregoing embodiments only in the interferometric principle involved, common components of the systems are not described in detail. Only those components and ray-trace aspects necessary for an understanding how the wavefront-shearing interferometric principle is applied are described in detail. Rays of only one primary color (blue) are traced, as rays of other primary colors will behave and interact in exactly the same manner.

Reflected from GLVs 10R, 10G and 10B will be phase-modulated, but otherwise plane, wavefronts 24MR, 24MG and 24MB (see FIG. 9A). These wavefronts copropagate along axis 48 and are directed into projection optics 52 which include lenses 56 and 58 having the same function as in above-described projection systems, and which, likewise, practically will be multi-element lenses.

Between lenses 56 and 58 is a wavefront dividing and shearing arrangement 82, consisting of a beamsplitter cube 84 a fixed mirror 86 (which could, of course, be a coated face of the cube) and an adjustable mirror 88 which can be moved axially, and tilted in two orthogonal axes. Wavefront division is accomplished by forty-five degree surface 83, which has a partially-transmitting, partially-reflecting filter coating (not shown).

Figure 10:
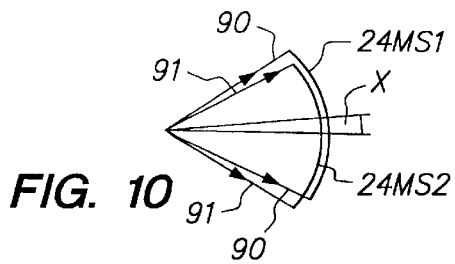
FIG. 10 is a general cross-section view schematically illustrating angular shearing of spherical wavefronts by a wavefront-shearing optical arrangement in the system of FIGS. 9A and 9B.

Continuing with reference to FIG. 9A and additionally to FIG. 10, lens 56 is preferably configured such that, in space 88 between beamsplitter cube 84 and lens 58, wavefronts propagating along axis 48 (here "folded" ninety degrees by surface 83) are spherical, however, still phase-modulated. The result of tilting mirror 88 with respect to mirror 86 is that spherical phase-modulated wavefronts 24MS1 and 24MS2 emanating from each (represented by rays 90 and 91 only in FIG. 9A) appear to be angularly sheared by an angle X with respect to one another, while still being essentially in the same (spherical plane).

Lens 58 includes one or more field-flattening elements (not shown) such that after wavefronts 24MS1 and 24MS2 are passed through the lens they are flattened to provide a pair of corresponding, parallel, blue, phase-modulated wavefronts 24MB1 and 24MB2. These wavefronts are then imaged onto screen 50, as indicated in FIG. 9B by traced rays 37, 37B1 and 37B2, to interferentially combine and form a polychromatic image.

Wavefronts 24MB1 and 24MB2 are laterally sheared with respect to each other by an distance Y. This distance is made some whole multiple, preferably one, of the spacing between moveable members 12 of the GLVs. The manner in which phase-modulated wavefronts 24MB1 and 24MB2 interferentially combine is next described with reference to FIGS 11A and 11B.

Figure 11A:
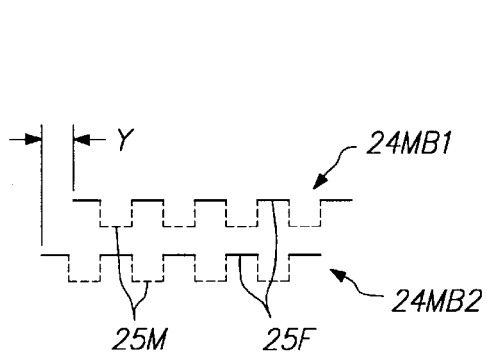
FIGS 11A and 11B are general cross-section views schematically illustrating interferential combination of laterally-sheared, plane, phase-modulated wavefronts in the system of FIGS. 9A and 9B.

As illustrated in FIG. 11A, in one combination aspect, each of wavefronts 24MB1 and 24MB2 includes fixed portions 25F and phase-modulated portions 25M corresponding to fixed and moveable reflective-members 18 and 12 of GLV 10B. When laterally sheared, one with respect to another, by a distance Y equal to a spacing between adjacent moveable members, each fixed portion of one wavefront will align with a phase-modulated portion of the other. Each fixed and phase-modulated aligned pair of wavefront portions will in effect be a microscopic interferometer and will provide an image element having a brightness determined by the phase relationship between the pair. In this aspect, any one of the wavefronts can be considered as acting as a reference wavefront for the other.

Figure 11B:
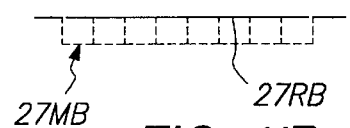

As illustrated in FIG. 11B, in another combination aspect, a superposition of wavefronts 24MB1 and 24MB2 can also be regarded as forming two other wavefronts, one 27MB of which is phase-modulated, and the other 27RB of which is a phase-constant reference wavefront. Inteferential combination of wavefronts 27MB and 27RB provides the blue portion of the polychromatic image on screen 50.

Whatever combination aspect is considered, the polychromatic image can be regarded as being formed from red, green, and blue pairs of wavefronts. Interferential combination of the red, green and blue wavefront pairs forms respectively red, green and blue, primary color portions of the polychromatic image.

Those skilled in the art will recognize that while above-described systems have been described in terms of using principles of the Michelson interferometer and a wavefront-shearing interferometer, other interferometric arrangements may be employed without departing from the spirit and scope of the present invention. In particular it should be noted that the wavefront-shearing arrangement described is but one of several well-known, wavefront-shearing arrangements.

All of the above-described embodiments of interferometric display systems in accordance with the present invention have been described in a form in which a two dimensional GLV array is used as a spatial light-modulator providing a phase-modulated wavefront for image formation. The two dimensional array includes a plurality of rows of moveable and fixed reflective-members, at least one row representing one row or line of picture elements (pixels) for each such line in the image. Each pixel as noted above may be represented by one or a plurality of moveable members.

Principles of the present invention are equally applicable, however, if a one-dimensional GLV array including only one row of fixed and moveable reflector members is used. In such a case, a scanning arrangement must be provided for scanning an interferometrically-generated image (real or virtual) through the field of view of a viewer. The GLV array is operated cooperatively with a drive unit for the scanning means, such that the array sequentially represents sequential lines of the image to be displayed. For representing an image formed from M lines of N pixels, a one-dimensional GLV would require M×B moveable elements, where B is the number of data bits per pixel. The one-dimensional GLV array would typically be modulated M times in a single scan to sequentially represent the M display lines. A brief description of arrangements for providing real (projected) and virtual (directly viewed) images using interferometric principles is set forth below with reference to FIGS. 12, 12A, and 12B.

Figure 12B:
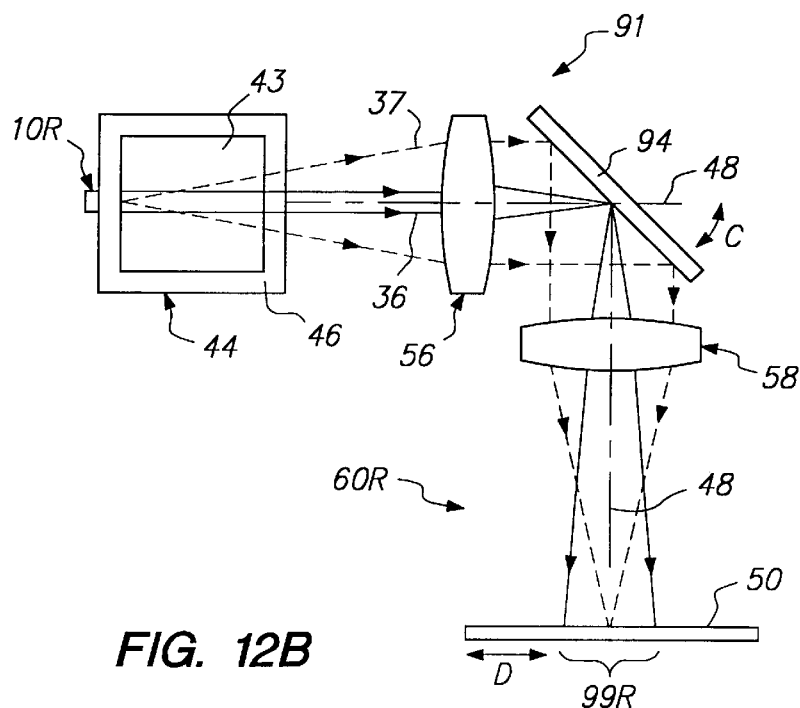
Figure 12:
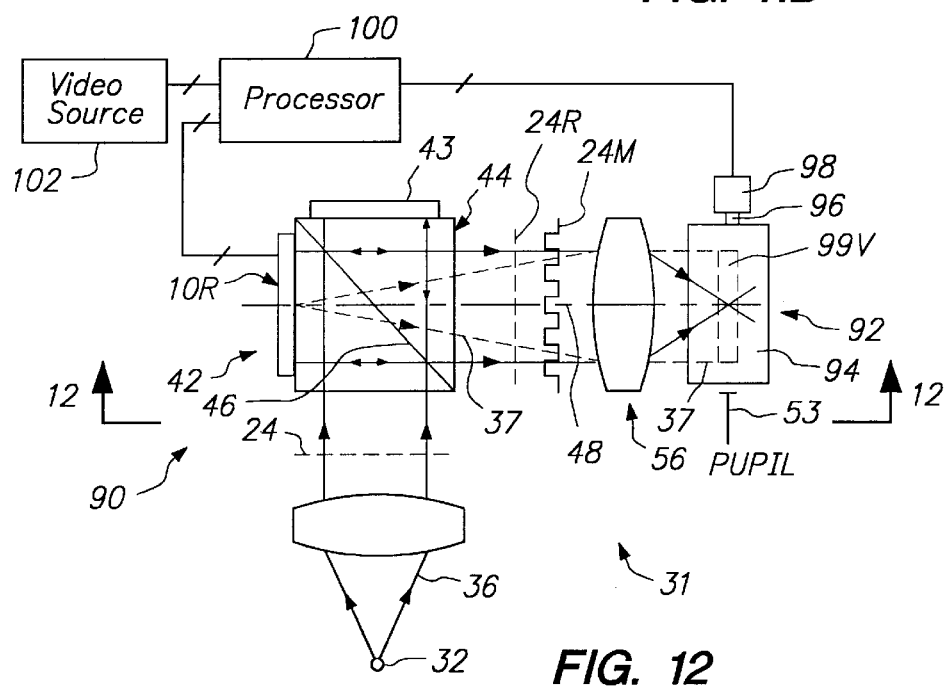
FIG. 12 is a general cross-section view schematically illustrating one aspect of a preferred embodiment of a scanning, monochromatic display system in accordance with the present invention based on a Michelson interferometer principle.
Figure 12A:
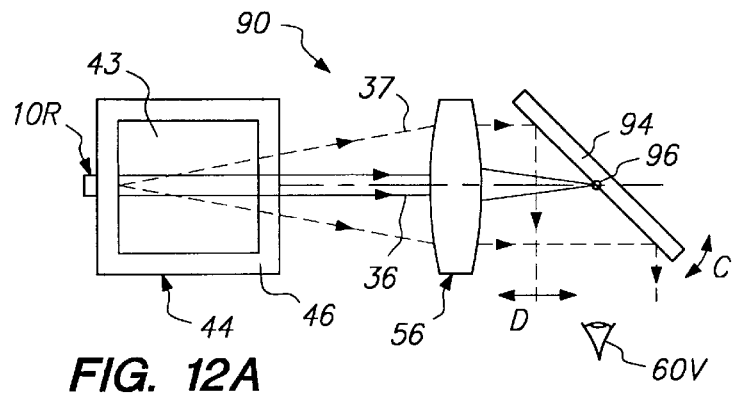
FIG. 12A is a general cross-section view, seen generally in the direction 12—12 of FIG. 12, schematically illustrating another aspect the scanning, monochromatic display system of FIG. 12, wherein the system is arranged for direct viewing.

FIGS. 12 and 12A illustrate a system 90 which is essentially identical with above-described system 31 (see FIG. 5), with the exception that in system 90 a one-dimensional GLV 10R is employed, rather than the two-dimensional GLV 10 of system 31. Images are formed by the system by interferential combination of phase-modulated and phase-constant wavefronts 24M and 24R respectively. Because an image formed is one-dimensional, a scanning arrangement 92 is provided for scanning the one-dimensional image as discussed above. Scanning arrangement 92 includes a scanning mirror 94 which is reciprocally, angularly scanned about an axis 96 by a drive motor 98, as indicated in FIG. 12 by arrow C. Scanning mirror 94 is preferably placed proximate exit pupil 53 on lens 56. Angular scanning of mirror 94 causes a virtual image of GLV array 10R (indicated whimsically in FIG. 12 by broken rectangle 99V) to be scanned linearly across the field of view of a viewer 60V as indicated by arrow D. An electronic processor 100, for converting video data from a source 102 thereof to a form useable by a GLV array, cooperatively operates moving members of GLV 10 and scan-drive motor 98 for causing the one-dimensional image to represent sequential display lines.

Referring now to FIG. 12B a system 91 is illustrated which is essentially identical with system 90 of FIG. 12A with the exception that a projection lens 58 is added for projecting a one dimensional real image 99R on screen 50. Angular scanning of mirror 94, here, causes image 99R to be swept across screen 50 through the field of view of a viewer 60R as indicated by arrow D.

Figure 5:
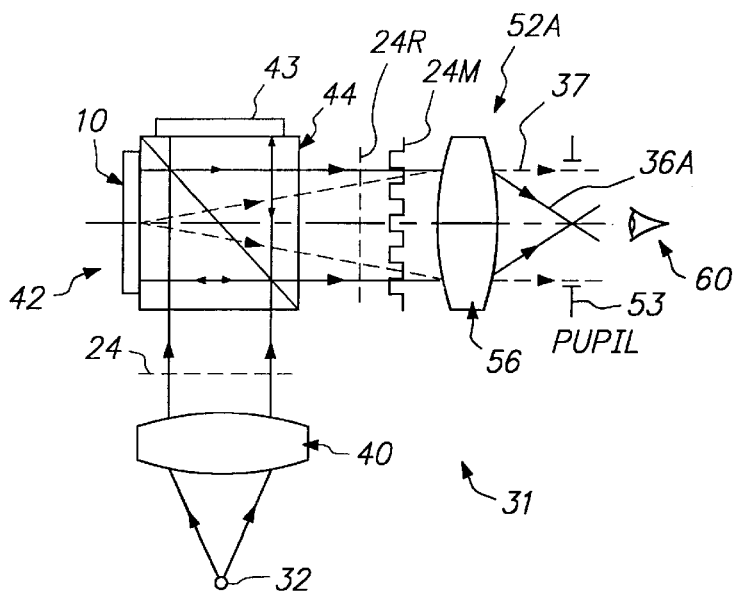
FIG. 5 is a general cross-section view schematically illustrating a second preferred embodiment of a monochromatic display system in accordance with the present invention based on a Michelson interferometer principle, and arranged for direct viewing of a virtual image.

Above-described scanning systems 90 and 91 have been depicted in a simple form, based respectively on the monochromatic, Michelson-interferometer-based, two-dimensional systems 31 and 30 of FIGS. 5 and FIG. 4. This has been done to highlight the scanning aspect of the systems and to avoid unnecessary repetition of polychromatic light-handling and interferometer aspects already described in detail. It will be evident to one skilled in the optical art, however, that the scanning principles described are applicable to any of the above-described two-dimensional systems or variations of those systems, as the interferometric image forming aspects of the systems are independent of whether the GLV array has one or two usable dimensions.

It will also be evident to one skilled in the optical art that reflective scanning arrangement 92 is but one of several well-known scanning arrangements, that may be employed. Any such scanning system may be used, more or less effectively, without departing from the spirit and scope of the present invention.

In summary, display systems employing a planar GLV array as a spatial light-modulator for representing an image to be displayed have been described. The systems rely for image representation on the phase-position of moveable reflective elements of the GLV array, which move through planes parallel to the plane of the array. The moveable elements provide, from a phase-constant wavefront incident thereon, a reflected phase-modulated wavefront representing the image to be displayed. The displayed image is provided by interferentially combining the phase-modulated wavefront with a reference wavefront also formed, directly or indirectly, from the incident phase-constant wavefront.

The present invention has been described and depicted as a several preferred embodiments. The invention is not limited, however, to those embodiments described and depicted. Rather the invention is limited only by the claims appended hereto.

What is claimed is:

1. A system for displaying an image, comprising:
   at least one planar grating light-valve (GLV) array including at least one row of elongated, spaced-apart, parallel-aligned, moveable reflective-members, each of said moveable reflective-members individually moveable with respect to the grating plane, through planes parallel thereto, to an extent corresponding to an element of the image to be displayed; and
   imaging interferometer means for displaying an interferogram image of the at-least-one GLV array, the interferogram image, at any instant in time, representing at least a portion of the image to be displayed.

2. The system of claim 1, wherein said imaging interferometer means is arranged according to a Michelson interferometer principle.

3. The system of claim 1, wherein in said GLV array, a row of spaced-apart fixed reflective-members is provided in every row of moveable reflective-members, and said fixed reflective-members are located in a plane parallel to said grating plane, spaced-apart by the same distance as said moveable reflective-members, and laterally arranged such that each thereof is in a position between adjacent ones of said moveable reflective-members; and wherein said imaging interferometer means is arranged according to a wavefront-shearing interferometer principle.

4. A system for displaying an image, comprising:
   a planar grating light-valve (GLV) array including a plurality of rows of elongated, spaced-apart, parallel-aligned, moveable reflective-members, each of said moveable reflective-members individually moveable with respect to a grating plane, through planes parallel to the grating plane, to an extent corresponding to an element of the image to be displayed;
   first optical means for providing a first, phase-constant optical-wavefront;
   second optical means for forming said first optical-wavefront into a second optical-wavefront spatially phase-modulated by said moveable reflective-members of said GLV array, and a third phase-constant optical-wavefront;
   third optical means for forming first and second images of respectively said second and third optical-wavefronts;
   and said second and third optical means arranged such that said first and second images interferentially combine to provide the image to be displayed.

5. The system of claim 4, wherein said first and second images are real images projected onto a viewing surface.

6. The system of claim 4, wherein said first and second images are virtual images and are directly viewable by a viewer via said third optical means.

7. The system of claim 4 wherein said second and third optical-wavefronts are provided by dividing said first optical-wavefront into two portions and reflecting one thereof from said GLV array to provide said second optical wavefront, and reflecting the other thereof from a reference mirror to provide said third optical-wavefront.

8. The system of claim 4, wherein in said GLV array, a row of spaced-apart fixed reflective-members is provided in every row of moveable reflective-members, and said fixed reflective-members are located in a plane parallel to said grating plane, spaced-apart by the same distance as said moveable reflective-members, and laterally arranged such that each thereof is in a position between adjacent ones of said moveable reflective-members.

9. The system of claim 8 wherein said second optical means causes said first optical-wavefront to be reflected from said GLV array, then divided into two complex optical-wavefronts each thereof including phase-constant and phase-modulated portions corresponding to respectively said fixed and moveable reflective-members of said GLV array; and said second optical means causes said two complex optical-wavefronts to propagate axially, laterally displaced one from the other by a distance equal to a whole multiple of a spacing between reflective-members, such that said phase-modulated portions of said two complex wavefronts combine to form the second reflected wavefront, and said phase-constant portions of said two complex wavefronts combine to form the third reflected wavefront.

10. The system of claim 4, wherein said first second and third wavefronts are plane wavefronts.

11. A system for displaying an image, comprising:
a grating light-valve (GLV) array including a plurality rows of elongated, spaced-apart, parallel-aligned moveable reflective-members, each of said moveable reflective-members individually moveable with respect to a grating plane, through planes parallel to the grating plane, to an extent corresponding to an image element to be displayed;
a reference mirror;
first optical means for providing a first, phase-constant optical-wavefront;
second optical means for dividing said first optical-wavefront into first and second portions, said second optical means for forming said first portion of said first portion of said first optical-wavefront into a second optical-wavefront spatially phase-modulated by said moveable reflective-members of said GLV array, and for forming said second portion of said first optical-wavefront, by reflection thereof off said reference mirror, into a third, phase-constant optical-wavefront;
third optical means for forming first and second images of respectively said second and third optical-wavefronts; and
said second and third optical means arranged such that said first and second images interferentially combine to provide the image to be displayed.

12. The system of claim 11, wherein said first and second images are real images projected onto a viewing surface.

13. The system of claim 11, wherein said first and second images are virtual images and are directly viewable by a viewer via said third optical means.

14. A system for displaying an image, comprising:
a grating light-valve (GLV) array including a plurality of rows of elongated, spaced-apart, parallel-aligned, moveable reflective-members, each of said moveable reflective-members individually moveable with respect to a grating plane, through planes parallel to the grating plane, to an extent corresponding to an image element to be displayed, a row of spaced-apart fixed reflective-members being provided in every row of moveable reflective-members, and said fixed reflective-members being located in a plane parallel to said grating plane, spaced-apart by the same distance as said moveable reflective-members, and laterally arranged such that each thereof is in a position between adjacent ones of said moveable reflective-members;
first optical means for providing a first phase-constant optical-wavefront;
second optical means for causing said first optical-wavefront to be reflected from said GLV array then divided into two complex optical-wavefronts, each thereof including phase-constant and phase-modulated portions corresponding to respectively said fixed and moveable reflective-members of said GLV array, and for causing said two complex optical-wavefronts to propagate coaxially, laterally displaced one from the other by a distance equal to a whole multiple of a spacing between reflective-members, such said phase-modulated portions of said two complex optical-wavefronts combine to form a second optical-wavefront spatially modulated by said moveable reflective-members of said GLV array, and said phase-constant portions of said two complex wavefronts combine to form a third, phase-constant optical-wavefront; and
third optical means for forming first and second images of respectively said second and third optical-wavefronts;
and said second and third optical means arranged such that said first and second images interferentially combine to provide the image to be displayed.

15. The system of claim 14, wherein said first and second images are real images projected onto a viewing surface.

16. The system of claim 14, wherein said first and second images are virtual images and are directly viewable by a viewer via said third optical means.

17. A system for displaying a poychromatic image, comprising:
first, second, and third, planar, grating light-valve (GLV) arrays, for processing respectively, red, green and blue primary color components of the image to be displayed, each of said GLV arrays including a plurality rows of elongated, spaced-apart, parallel-aligned, moveable reflective-members, each of said moveable reflective-members individually moveable with respect to a grating plane, through planes parallel to the grating plane to an extent corresponding to an image element to be displayed;
a reference mirror;
a source of polychromatic light including wavelengths representative of said red, green, and blue components of the image to be displayed;
first optical means for providing from said source of polychromatic light a first, phase-constant, optical-wavefront, said first optical-wavefront including said red, green, and blue color components;
second optical means for forming a first portion of said first optical-wavefront into red, green, and blue, second optical-wavefronts spatially phase-modulated by said moveable reflective-members of respectively said first, second, and third GLV arrays, and for reflecting a second portion of said first optical-wavefront off said reference mirror to form a third phase-constant optical-wavefront;
third optical means for forming first, second, third, and fourth images of respectively said red, green and blue second optical wavefronts and said third optical-wavefront; and
said second and third optical means arranged such that said first, second, third, and fourth images interferentially combine to provide the polychromatic image to be displayed.

18. The system of claim 17, wherein said first and second images are real images projected onto a viewing surface.

19. The system of claim 17, wherein said first and second images are virtual images and are directly viewable by a viewer via said third optical means.

20. The system of claim 17, wherein said polychromatic light source includes separate red, green, and blue monochromatic light sources the light output of which is combined by an arrangement of dichroic filters to provide polychromatic light.

21. A system for displaying a polychromatic image, comprising:

first second and third grating light-valve (GLV) arrays for processing respectively, red, green and blue primary color components of the image to be displayed, each of said GLV arrays including a plurality of rows of elongated, spaced-apart, parallel-aligned, moveable reflective-members, each of said moveable reflective-members individually moveable with respect to a grating plane, through planes parallel to the grating plane, to an extent corresponding to an image element to be displayed, a row of spaced-apart fixed reflective-members being provided in every row of moveable reflective-members, and said fixed reflective-members being located in a plane parallel to said grating plane, spaced-apart by the same distance as said moveable reflective-members, and laterally arranged such that each thereof is in a position between adjacent ones of said moveable reflective-members;

a source of polychromatic light including wavelengths representative of said red, green, and blue components of the image to be displayed;

first optical means for providing from said source of polychromatic light a first, phase-constant, polychromatic optical-wavefront, said first optical-wavefront including said red, green, and blue color components;

second optical means for dividing said first polychromatic optical-wavefront into separate red, green, and blue, first optical-wavefronts, for causing said red green, and blue first optical-wavefronts to be reflected from respectively said first second and third GLV arrays, for causing each of said reflected red, green, and blue first optical-wavefronts to be divided into a pair of complex optical-wavefronts each thereof including phase-constant and phase-modulated portions corresponding to respectively said fixed and moveable reflective-members of said GLV array, and for causing the pair of complex optical-wavefronts to propagate coaxially, laterally displaced one from the other by a distance equal to a whole multiple of a spacing between reflective-members, such that phase-modulated portions of red, green, and blue complex optical-wavefront pairs combine to form respectively red, green and blue second optical-wavefronts spatially modulated by said moveable reflective-members of respectively said first second, and third GLV arrays, and the phase-constant portions of the red, green, and blue complex optical-wavefront pairs combine to form respectively red, green, and blue third, phase-constant optical-wavefronts;

third optical means for forming first, second third, fourth, fifth, and sixth images of respectively said red, green, and blue second optical-wavefronts, and said red, green and blue third optical-wavefronts; and said second and third optical means arranged such that said first, second third, fourth, fifth, and sixth images interferentially combine to provide the polychromatic image to be displayed.

22. The system of claim 21, wherein said first and second images are real images projected onto a viewing surface.

23. The system of claim 21, wherein said first and second images are virtual images and are directly viewable by a viewer via said third optical means.

24. The system of claim 21, wherein said polychromatic light source includes separate red, green, and blue monochromatic light sources light sources, the light output which is combined by an arrangement of optical filters to provide polychromatic light.

25. A system for displaying an image, comprising:

a grating light-valve (GLV) array including a plurality of rows of elongated, spaced-apart, parallel-aligned, moveable reflective-members, each of said moveable reflective-members individually moveable with respect to a grating plane, through planes parallel to the grating plane, to an extent corresponding to an image element to be displayed, a row of spaced-apart fixed reflective-members being provided in every row of moveable reflective-members, and said fixed reflective-members being located in a plane parallel to said grating plane, spaced-apart by the same distance as said moveable reflective-members, and laterally arranged such that each thereof is in a position between adjacent ones of said moveable reflective-members;

first optical means for providing a first phase-constant optical-wavefront;

second optical means for causing said first optical-wavefront to be reflected from said GLV array then divided into second and third optical-wavefronts, each thereof including phase-constant and phase-modulated portions corresponding to respectively said fixed and moveable reflective-members of said GLV array, and for causing said first and second optical-wavefronts to propagate coaxially, laterally displaced one from the other by a distance equal to a whole multiple of a spacing between reflective-members; and third optical means for forming first and second images of respectively said second and third optical-wavefronts;

and said second and third optical means arranged such that said first and second images interferentially combine to provide the image to be displayed.

26. The system of claim 25, wherein said first and second images are real images projected onto a viewing surface.

27. The system of claim 25, wherein said first and second images are virtual images and are directly viewable by a viewer via said third optical means.

28. A system for displaying an image to viewer, comprising:

at least one planar grating light-valve (GLV) array including a row of elongated, spaced-apart, parallel-aligned, moveable reflective-members, each of said moveable reflective-members individually moveable with respect to the grating plane, through planes parallel thereto, to an extent corresponding to an element of the image to be displayed; and wherein the displayed image is formed by sweeping a sequence of interferogram images of the GLV array through the field of view of the viewer.

29. The system of claim 28, wherein said inteferogram images are a real images projected onto a viewing surface.

30. The system of claim 28, wherein said inteferogram images are virtual images viewed by the viewer via optical means included in the system for forming said interferogram images.

31. A system for displaying a two-dimensional image, the two-dimensional image including a plurality of lines of image elements, the system comprising:

a grating light-valve (GLV) array including a row of elongated, spaced-apart, parallel-aligned, moveable reflective-members, each of said moveable reflective-members individually moveable with respect to a grating plane, through planes parallel to the grating plane, to an extent corresponding to an element of a line of the image to be displayed;

first optical means for providing a first, phase-constant optical-wavefront;

second optical means for forming said first optical-wavefront into a second optical-wavefront spatially phase-modulated by said moveable reflective-members of said GLV array, and a third phase-constant optical-wavefront;

third optical means for forming first and second images of respectively said second and third optical-wavefronts;

said second and third optical means arranged such that said first and second images interferentially combine to provide an image line of the image to be displayed;

electronic means for operating said moveable elements such that said image line sequentially represents all lines of the image to be displayed; and scanning means, cooperative with said third optical means and said electronic means, for moving said image line transversely through the field view of a viewer such that said moving image line appears to the viewer as a the two dimensional image.

32. The system of claim 31, wherein said first and second images are real images projected onto a viewing surface viewable by the viewer.

33. The system of claim 32, wherein said first and second images are virtual images and are directly viewable by the viewer via said third optical means.

* * * * *

UNITED STATES PATENT AND TRADEMARK OFFICE
CERTIFICATE OF CORRECTION

PATENT NO.     : 6,088,102
DATED          : July 11, 2000
INVENTOR(S)    : Paul K. Manhart Page 1 of 1

It is certified that error appears in the above-identified patent and that said Letters Patent is hereby corrected as shown below:

<u>Title page,</u>
U.S. PATENT DOCUMENTS,
Page 2, delete "4,662,764" and insert -- 4,662,746 --.
Page 3, delete "5,297,473" and insert -- 5,291,473 --.
Page 3, between "5,312,513" and "5,313,648," insert -- 5,313,479  5/1994  Florence...372/26 --.

Signed and Sealed this

Twelfth Day of February, 2002

*Attest:*

*Attesting Officer*

JAMES E. ROGAN
*Director of the United States Patent and Trademark Office*